Feb. 5, 1952 — C. A. CHMIELEWSKI — 2,584,379
PIE PLATE
Filed Jan. 27, 1950 — 2 SHEETS—SHEET 1
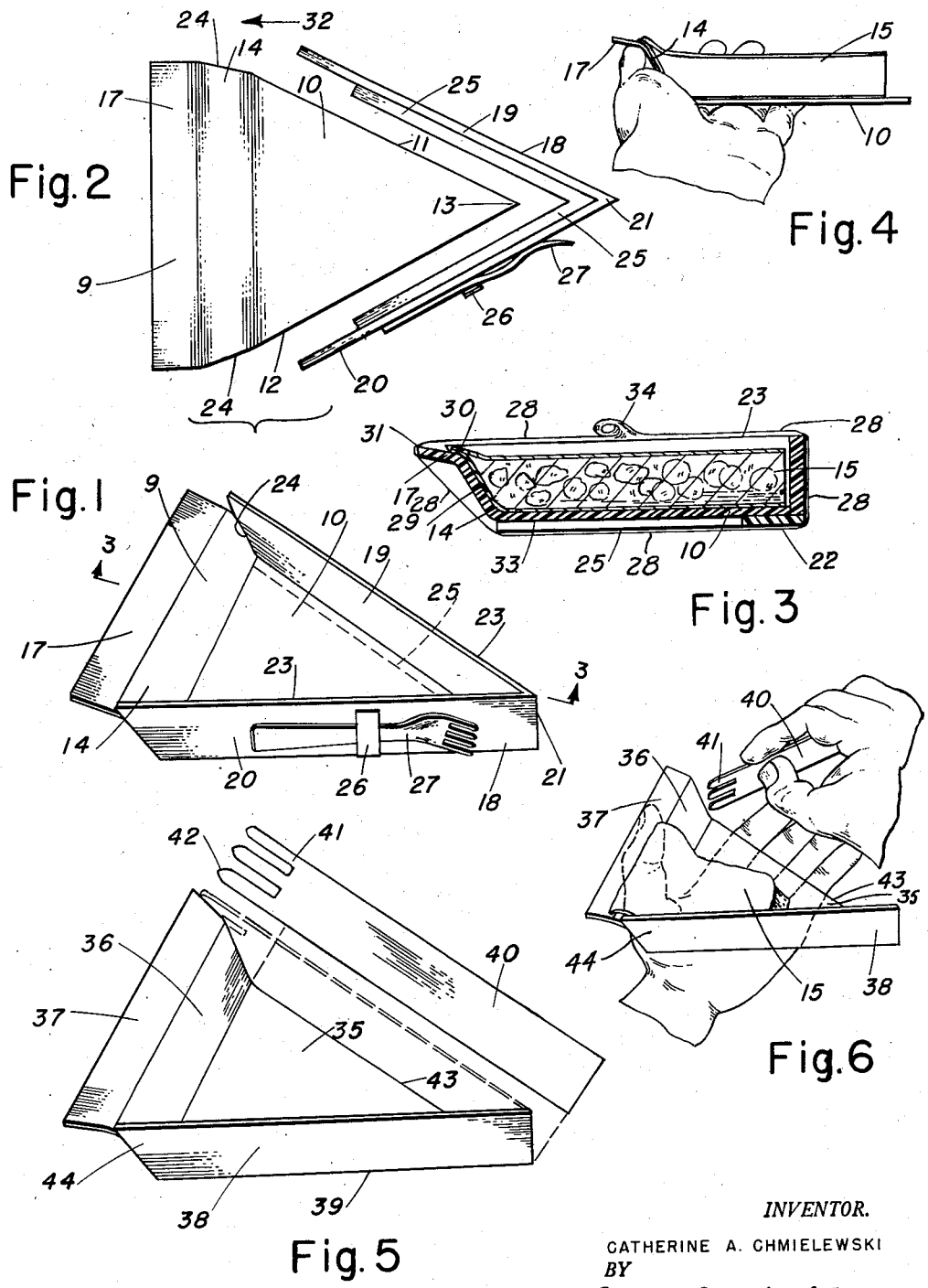
INVENTOR.
CATHERINE A. CHMIELEWSKI
BY
Morris Michael Marks
ATTORNEY Feb. 5, 1952    C. A. CHMIELEWSKI    2,584,379
PIE PLATE
Filed Jan. 27, 1950    2 SHEETS—SHEET 2
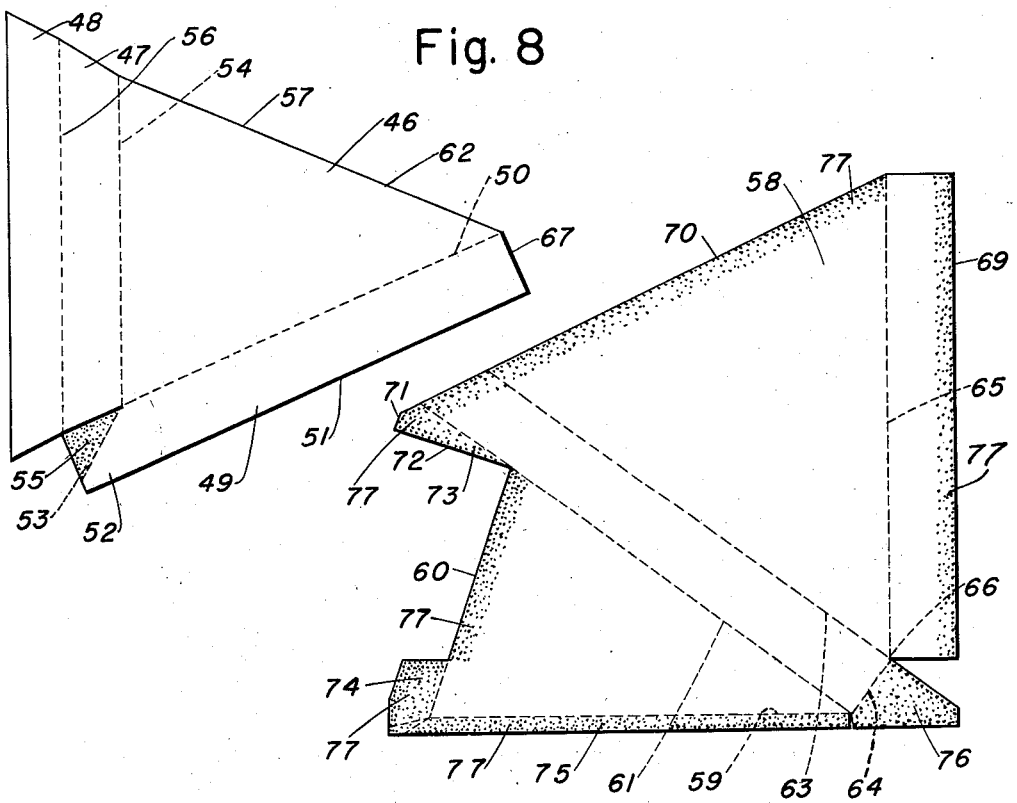
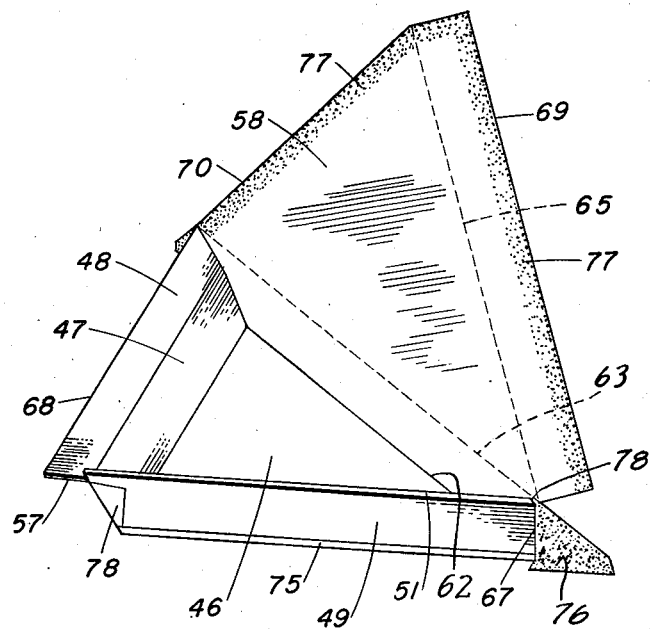
INVENTOR.
CATHERINE A. CHMIELEWSKI
BY
*Morris Michael Marks*
ATTORNEY Patented Feb. 5, 1952

2,584,379

UNITED STATES PATENT OFFICE 2,584,379

PIE PLATE

Catherine A. Chmielewski, Trenton, N. J.

Application January 27, 1950, Serial No. 140,799

1 Claim. (Cl. 206—4)

My invention relates to pie plates and it relates more particularly to means for packaging and serving a cut piece of pie.

It has long been known that homemade pies, or standard-size pies generally are more delectable and more appealing to the taste than small-size pies which are baked and packaged in individual-portion sizes. One reason for this is that the ratio of filling to crust is much larger in the standard size pies than in the individual-portion pies. Another reason is that there is generally more juice per pie in the standard size than in the individual-portion pie. Also, there appears to be a difference in taste resulting from the baking of the filling in the larger quantity instead of in the smaller quantity used in individual-portion pies. Furthermore, a cut piece of standard-size pie reveals the filling and juices as exposed on two sides of the wedge, thereby appealing to the eye; whereas an individual-portion pie is generally completely covered by crust and the filling is not exposed to view so as to tempt the appetite.

It would therefore be highly desirable to provide a means for packaging and serving a cut piece of standard-size pie. This, however, has been hitherto impracticable; for there is almost no inherent strength in the pie to protect it from any downward pressure, and the very means required for protecting the pie from downward pressure inhibit ready access to the pie when it is desired to eat it in its packaging container. With the top of the pie unprotected from pressure, the pie loses not only its normal appearance and texture, but also tends to become appetite-repelling rather than taste-tempting; and with the sides of the cut pie wedge surrounded by sturdy, unyielding vertical walls as hitherto required to protect them, it is impracticable to use a fork to eat the pie in its package, and attempts to do so merely result in appetite-repelling frustration. Moreover, juices sometimes tend to escape, and in attempts hitherto made at packaging, the package and pie often become messy.

One object of my invention therefore, is to provide a pie plate which is so constructed as to enable a cut-piece of standard-size pie to be carried thereby, while protecting the pie from destructive pressure or from any other contact which would tend to change its original shape.

Another object of my invention is to provide a pie plate which will capture escaping juices and inhibit them from harmfully affecting the pie or the package.

A further object of my invention is to provide a pie plate which shall expose to view the cut portion of a piece of pie, thereby to reveal the taste-tempting filling while sealing the pie from deleterious contact with the atmosphere or with dust or dirt.

Another object of my invention is to provide a pie plate which shall serve not merely as a container for a cut piece of pie, for purposes of carrying the same, but also will enable the user thereof to serve the pie directly on said plate, without having to remove the pie therefrom.

A further object of my invention is to provide a ready and facile means for packaging and sealing a cut piece of pie, which shall be inexpensive to manufacture and to use, and attractive in appearance.

Another object of my invention is to provide means for packaging and serving a cut piece of pie, which may readily be carried in a lunch box and utilized at will.

Other objects of my invention will appear from the detailed disclosure set forth hereinafter.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring now to the drawings in which like reference characters indicate like parts:

Figure 1 represents a perspective view of a pie plate embodying my invention.

Figure 2 represents a plan view of a pie plate embodying my invention showing the base member separated from the guard member.

Figure 3 represents a sectional view taken generally along the lines of 3—3 of Figure 1 and illustrating a pie contained therein.

Figure 4 represents a view of the pie plate held in pie serving position, and embodying my invention.

Figure 5 represents a perspective view of a pie plate having a fork wall removed therefrom to enable the pie to be eaten therewith, said pie plate being of modified construction, and embodying my invention.

Figure 6 represents a perspective view showing the pie plate illustrated in Figure 5 in actual use and in pie serving position, and embodying my invention.

Figure 7 represents a pie plate of another modified construction and embodying my invention.

Figure 8 represents a development view of the base member of the pie plate illustrated in Figure 7.

Figure 9 represents a development view of the diaphanous material of the pie plate illustrated in Figure 7.

According to my invention my pie plate may be made of plastic, paper or paper products, fiber, wood or wood products, sheet metal, ceramics, or the like. Preferably there is provided a base member 9 comprising a base plate 10, of wedge-shaped formation so as to provide a side edge 11, and a side edge 12, conjoining at a frontal and medial included angle 13. The rear of the base plate 10 is either formed integrally with, or conjoined to, an upwardly inclined wall 14 extending rearwardly from the base plate 10 at an angle substantially equal to the angle between the side walls and base of the standard pie plate on which the pie is baked. The inclined wall 14 extends above the base plate 10 a distance preferably equal to the height of the standard pie plate on which the pie is baked. Thus, the cut piece of pie 15 which is intended to be carried by the pie plate will be supported in its original position and condition, while resting in its container. A rearwardly extending lip 17 is formed integrally with or conjoined to the inclined wall 14 and is likewise preferably inclined, but at a shorter angle with respect to the base plate 10.

A guard member 18 is provided, having substantially vertical walls 19 and 20 conjoined at their front ends 21 and disposed at an angle identical to the angle between the side edges 11 and 12 of the base plate 10. The walls 19 and 20 extend rearwardly from their conjoined frontal edges 21 a distance at their lower edges 22, sufficiently great to embrace between said walls 19 and 20, the base plate 10 of the base member 9 when said plate is disposed therebetween with the juncture 13 juxtaposed to the juncture 21 and the edges 11 and 12 are respectively opposite the edges 22 of the walls 19 and 20. The upper edges 23 of the walls 19 and 20 extend a distance from the juncture 21 sufficiently great to embrace therebetween the inclined wall 14 when the base member 9 is thus disposed within the guard member 18. In one preferred form of my invention, the inclined wall 14 is formed with upwardly diverging side edges 24 substantially defining the respective lines of interception between the inclined wall 14 and the vertical walls 19 and 20 when said base member 9 is thus embraced by said vertical walls.

A preferably short ledge or flange 25 projects inwardly from the lower edges 22 of the walls 19 and 20, and defines the lower limit of the passage formed by the walls 19 and 20, at the forward end of said passage. Thus, while the base member 9 may be freely moved in any direction in that portion of the passage not defined by said ledges 25, it is effectively contained and supported by the ledges 25 when the base plate 10 is advanced therein to proximity to its forwardmost position. By this means also, a short withdrawal of the base member 9 effectuates a quick release from the passage, and the guard member 18 can thus be quickly and readily removed from the base member 9 without risk of damage to the pie 15 resting thereon.

If desired, a clip or other suitable holder member 26 may be secured to, or otherwise formed on, the guard member 18 to hold a fork 27 which may be carried thereby and removed therefrom at will, for use in eating the piece of pie 15. If desired however, the clip may be disposed on the underside of the inclined wall 14 or the lip 17, and it is to be understood that my invention contemplates the use of the holder in this position if desired, without departing from the spirit or essential attributes thereof.

A sheet 28 of film-like or diaphanous material, such as wax paper, cellophane, aluminum or other metal foil, or the like, is also provided, for use as hereinafter described.

In operation, the piece 15 is cut from an original standard-size pie, and is inserted on the base member 10 with its rearward or outer, crust portion 29 resting against the rearwardly inclined wall 14 and the top, outer edge 30 of crust similarly resting on the forwardly inclined lip 17. In this position, the upper edge 30 of the crust is below the level of the rearward edge 31 of the lip 17, which rearward edge 31 is preferably at the same level as the upper edge 23 of the guard walls 19 and 20. In this position also, the pie is supported in its original condition and any tendency for it to shift about on the base 10, is inhibited. The guard member 18 is then advanced toward the base member 9 in the direction illustrated by the arrow 32 until the walls 19 and 20 are juxtaposed to the edges 11 and 12, and the lower edge 33 of the base 10 rests upon the ledges 25 of the guard walls 19 and 20. The conjoined base and guard member are then laid on the sheet 28 of diaphanous material, and the outer edges of said sheet 28 are lifted up about the container and wrapped together as at 34 in any suitable manner. The pie is now ready safely to be carried in the container, and in all cases where a diaphanous sheet 28 is made of transparent material, can be viewed through said sheet while in the container.

When it is desired to eat the pie, it is simply necessary to remove the film-like or diaphanous sheet 28 and slide the guard member 18 outwardly in a direction opposed to that indicated at 32, until the base plate 10 has uncovered the ledges 25. In so doing, the exposed sides of the cut pie piece 15 are removed from contiguity to the side walls 19 and 20 of the guard member, while at the same time the pie is not shifted in its position on the base plate 10; and indeed, the base member 9 is not moved at all. As can be seen from Figure 2, the relative movement of the guard member 18 with respect to the base member 9 need be but slight in order to disengage the guard member 18 from the base member 9. The guard member 18 may then be lifted or dropped away, or otherwise removed from proximity to the base member 9 and the cut pie 15 resting thereon. It will thus be seen that not only does the guard member protect the cut piece or wedge 15 of pie from external contact which would tend to crush it or otherwise to change its desirable and tastetempting appearance, but also means are provided for preventing contact between the guard walls 19 and 20 and the cut sides of the pie piece 15 when the guard member 18 is removed from guarding contiguity to the pie, in preparation for eating the pie.

To aid in holding the base member when the guard member 18 is removed therefrom, the lip 17 may be used as a handle; or the base 10, inclined wall 14 and lip 17 may be cupped in the hand with the thumb portion supporting the lip 17 and the palm and fingers supporting the base 10, substantially as illustrated in Figure 4. In this manner too, after the guard member 18 is removed, the pie plate can be held in one hand while the other hand utilizes the fork 27 for eating the pie.

In Figure 5 is illustrated a modified construction embodying my invention, wherein is provided a base 35, upwardly inclined rear wall 36 and outwardly projecting lip 37, of substantially the same configuration as that of similar portions of the base member 9. A vertically disposed side wall 38 is preferably formed integrally with the base 35 and folded upwardly, perpendicularly thereto, at the edge 39 thereof. The wall 38 is substantially similar in configuration and relative size, to the wall 20. A substantially similarly disposed wall 40 is preferably formed integrally with the base 35, but projects rearwardly therefrom a distance sufficient to have formed on the rearward projection 41 thereof, fork tines 42. The edge 43 between the base 35 and the wall 40 is preferably sharply creased or perforated so as to enable the wall 40 to be easily removed therefrom, by turning the wall outwardly about the edge 43 as a pivot, or by any other suitable means. It will thus be found, that a pie container or serving package 44 is herein provided whereby a cut pie wedge can be carried in the same manner as illustrated in the modification shown in Figures 1 to 3 inclusive, and a fork is built in the container 44 in such a manner that a wall of the container may be used as a protective structure for carrying the pie, and later used as an eating implement when it is desired to serve the pie. For this purpose, the container 44 may be made of fiber, plastic, pressed wood, or any other suitable material.

In operation, the pie is placed in the container 44 and the whole is preferably covered with a suitable wrapping (not shown) such as the film-like or diaphanous material 28 or the like. In this condition, it is readily carried in the container 44. When it is desired to eat the pie, the wrapping 28 is removed therefrom, and the wall 40 is turned outwardly about the base edge 43 until it snaps off from the base 35. The wall 40 then becomes a fork having tines 42 with the forward edge of the wall serving as the handle. The container 44 is then cupped in the hand, with the base 35 resting on the palm and fingers, the lip 37 resting along the thumb, and the wall 38 extending upwardly between the eater and the pie plate base 35, substantially as illustrated in Figure 6. In this condition, it will be found that the base is slightly inclined upwardly away from the eater, and all loose juices will flow toward the rearward part of the wall 38, collecting in the receptacle formed by the corner of the container 44 defined by the wall 38, base 35 and rearward wall 36. The fork 40 may readily be used to cut the pie piece 15 without interference from a vertical guard wall, by applying it across the edge 43, substantially as shown in Figure 6.

In Figure 7 is illustrated a pie plate of another modified construction embodying my invention. In this construction, which comprises a base member 57 and film-like or preferably diaphanous material 58, the base member 57 is preferably made of material which may be stamped or pressed into shape, although it can also be made of molded or plastic material, or the like. The base member 57 comprises a base plate 46, inclined rear wall portion 47 and lip portion 48, of substantially the same size and configuration as the base 35, rear wall 36 and lip 37, respectively. A vertical side wall 49 projects perpendicularly from one edge 50 of the base 46 and comprises an upper edge 51 parallel to the edge 50. The base 46, wall 47, lip 48 and wall 49 may be stamped out of an integral sheet as illustrated in Figure 8. When this is done, one preferred construction provides a rearward projection 52 on the wall 49 having a fold 53 rearwardly inclined from the region of the junction of the wall 49 with the rearward edge 54 of the base 46. Suitable adhesive material 55 is preferably applied to the upper surface of that portion of the projection 52 above and rearward of the fold 53. The base member 57 is then folded along the edges 50, 53, 54, and the region 56 intermediate the rearward wall 47 and the lip 48 so as to dispose the various elements of the base member 57 in proper position for pie holding and serving, said position being substantially as illustrated in Figure 7. In this operation, the rearward projection 52 is folded so as to dispose the adhesive surface 55 thereof against the rearward face of the inclined wall 47, thereby to hold the walls 49 and 47 permanently in their proper positions.

In Figure 9 is illustrated one construction of film-like or diaphanous material 58 formed to be secured to the base member 57 in a manner hereinafter described. Thus, there is outlined, as at 59, on the film-like or diaphanous material 58 a fold representing the location of the edge 50 to be disposed thereon, a rearward edge 60 substantially analogous to the desired location of the edge 54 of the base 46, and a fold 61 representing the desired location of te edge 62 of the base 46. Parallel to, and spaced from, the fold outline 61 a distance substantially equal to the height of the wall 49 is the fold outline 63. A fold outline 64 extends intermediate the outline 61 and 63 and is perpendicular thereto while being located substantially at the angle between the outlines 59 and 61. A fold outline 65 projects substantially from the junction of the outlines 64 and 63, and is disposed at an angle to the outline 63 equal to the angle between the outlines 59 and 61. The outlines 63 and 65 extend from the junction 66 a distance substantially equal to the distance between the front edge 67 of the wall 49 and proximity to the rearward edge 68 of the lip 48 in the assembled base member 57. An edge 69 extends parallel to the outline 65 throughout the length thereof, and is spaced therefrom a distance preferably substantially equal to the height of the wall 49. An edge 70 extends intermediate the outer termini of the outlines 63 and 65 and preferably projects rearwardly in a straight line, beyond the outlines 63 and 61 to a terminal portion 71 forming part of the edge 72 of a fold portion 73. A fold portion 74 preferably projects rearwardly of the edge 60 in proximity to the outline 59; a fold portion 75 preferably projects below the outline 59; and a fold portion 76 preferably projects forwardly of the outline 64 and downwardly from the lower end thereof. Adhesive material 77 of any suitable kind is disposed on the upper faces of the fold portions 73, 74, 75 and 76, and is also disposed on the upper faces of the areas immediately adjacent the edges 60, 69 and 70.

In operation, the base member 57 is placed on the film-like or diaphanous material 58 with the lower face of the base 46 resting on the upper face of the material 58, the rearward edge 54 of the base 46 being juxtaposed to the edge 60 of the material 58, the edge 62 of the base 46 being juxtaposed to the fold outline 61, and the fold 50 of the base being juxtaposed to the fold outline 59. In so doing, the adhesive 77 adjacent the edge 60 adheres to the base 46. The fold portion 75 is then folded upwardly along the fold outline 59 and against the outer face of the wall 49 and pressed thereagainst, thereby causing the fold portion 75 to adhere thereto by means of the adhesive 77. The fold portion 74 is then folded upwardly against the rearward face of the wall 47 and made to adhere thereto by means of the adhesive 77, and the outwardly projecting extension of the fold portion 74 is then folded forwardly against the outer face of the wall 49, as at 78. In this condition, the base member 57 and film-like or diaphanous material 58 are substantially as illustrated in Figure 7.

The pie wedge may then be inserted, the open side 62 being availed of to enable the pie to be slid or laid onto the base plate 46, inclined wall 47 and lip 48 with a modicum of disturbance, the side 62 preferably defining a portion of the passage for such insertion.

The loose end of the diaphanous or film-like material 58 is then lifted upwardly, preferably by grasping it along the fold outline 65, and pulled substantially taut simultaneously against the upper end 78 of the front edge 67 and the outer end 79 of the rearward edge 68, said ends 78 and 79 defining an axis parallel to the edge 62 but at the level of the edges 51 and 68. In so doing, the fold outline 63 will lie substantially on said axis. Continued pulling of the loose end of said material 58 about the axis defined by the fold 63, and over the edges 68 and 51, brings the fold outline 65 to juxtaposition to the upper edge 51 of the wall 49. The flap intermediate the fold outline 65 and edge 59 is then folded downwardly and the adhesive 77 thereon is pressed against the outer face of the wall 49, causing said flap to adhere thereagainst. The fold portion 72 is then bent upwardly against the under face of the lip 48 to adhere thereto, and the fold portion 76 is folded back against the material adhering to the outer face of the wall 49, the lower region of said fold portion 76 being folded upwardly against the base member 57 to adherence thereto. In stretching the material 58 across the top of the base member 57, the adhesive 77 applied to the region of the edge 70 bears against the lip 48 and may, if desired, be pressed thereagainst to assure complete adherence. The pie wedge is now completely sealed within the container.

In a preferred form of my invention, a fork (not shown), formed of wood, plastic, or the like, and encased in a glassine bag (not shown) is secured to the underside of the lip 48, as by adhesive, stapling or the like. Moreover, it is to be understood that in all cases where adhesive is mentioned, other means of securing may be used, such for instance as heat-sealing, stapling, dove-tailing, or the like.

It will be observed that by my construction, the pie wedge is protected against downward external pressure by the guard wall 49 and the rearward wall 47 and lip 48, and the covering stretched thereacross. Moreover, an open side is provided along the edge 62 for ready insertion of the pie and facile use of the fork, as for instance illustrated in Figure 6. In addition, in all cases where a transparent substance is used as the diaphanous material 58, the open side and top of the base member 57 covered by said diaphanous material 58, serve as a window through which can be seen a cut exposed side of the pie, and the top thereof. Moreover, the pie wedge resting against the base 46 and rearwardly upwardly supported in its natural, substantially original position by the inclined wall 47 and lip 48, as well as protected by the guard wall 49, is thus maintained substantially in its original shape and appearance, thereby adding measurably to its taste-tempting condition and very substantially improving its merchandisability.

It is to be understood that my invention is not limited to the specific type or configuration of cover material, or method of securing it to the base member. If desired, the cover may be formed integrally with the base member or any desired portion thereof, without departing from the spirit or essential attributes of my invention. Thus, the cover material (not shown) may project outwardly from the base plate 46 and a fold formed therebetween along the edge 62. Such cover material could be of substantially the same configuration as that illustrated for the loose end of the material 58 in Figure 7, or it may be of any other configuration suitable for covering the interior of the base member 46 and securing said cover in place. Also, if desired, a suitable window (not shown) could be cut into such cover material to expose to view the cut side of the pie wedge, without departing from the spirit or essential attributes of my invention.

I am aware that the invention may be embodied in other specific forms without departing from the spirit or essential attributes thereof, and I therefore desire the present embodiments to be considered in all respects as illustrative and not restrictive, reference being had to the appended claim rather than to the foregoing description to indicate the scope of the invention.

Having thus described my invention, what I claim as new and desire to obtain by Letters Patent is:

A cardboard pie plate for packaging and serving a cut piece of pie having an outer crust portion, a bottom, and a cut side portion, said pie plate comprising a base plate having a configuration substantially similar to the configuration substantially similar to the configuration of the horizontal outline of said cut piece of pie, but slightly larger than said outline, a rearward wall upwardly projecting from said base plate and inclined at an angle substantially identical to the angle between said outer crust portion and the bottom of said cut piece of pie, a member projecting from said rearward wall and at an angle thereto, the lower faces of said member, rearward wall and base plate defining mounting means whereby said pie plate may be mounted and supported on the upwardly turned hand of the eater; the height of one of said walls being greater than the height of said cut piece of pie; an edge portion of said base plate extending intermediate a portion of said side wall and a portion of said rearward wall and defining a portion of a passage into which a fork may be applied in cutting and eating said piece of pie; said edge portion being so disposed with respect to said side wall and rear wall that when said cut piece of pie is resting on said pie plate, with said bottom resting on said base plate and said outer crust portion resting on said rearward wall, said cut side portion will be disposed in proximity to said edge; and a film-like displaceable cover member secured to the outer surface of the base plate and projecting from the edge portion thereof and extending intermediate said rearward wall, side wall and said edge portion, at least a portion of said cover member being transparent, and disposed in proximity to said passage; and means for sealing the interior of said pie plate when said cover is in place.

CATHERINE A. CHMIELEWSKI.

REFERENCES CITED

The following references are of record in the file of this patent:

UNITED STATES PATENTS

| Number | Name | Date |
| --- | --- | --- |
| 1,257,057 | White | Feb. 19, 1918 |
| 1,526,397 | Thornton | Feb. 17, 1925 |
| 1,978,396 | Ardayanis et al. | Oct. 30, 1934 |
| 2,064,411 | Brandstein | Dec. 15, 1936 |
| 2,080,108 | Brandstein | May 11, 1937 |
| 2,452,969 | Victor | Nov. 2, 1948 |
| 2,506,256 | Waldo | May 2, 1950 |